United States Patent Office 3,169,135
Patented Feb. 9, 1965

3,169,135
19-NOR-$\Delta^{1(10)}$-5$\alpha$-PREGNEN-17$\alpha$-OL-2,20-DIONE AND DERIVATIVES THEREOF
Alexander D. Cross, Mexico City, Mexico, assignor to Syntex Corporation, Panama, Panama, a corporation of Panama
No Drawing. Filed Dec. 23, 1963, Ser. No. 332,963
Claims priority, application Mexico, July 18, 1963, 73,087
20 Claims. (Cl. 260—397.4)

The present invention relates to novel cyclopentanophenanthrene derivatives and to a process for the production thereof.

More particularly, the present invention relates to novel 19-nor-$\Delta^{1(10)}$-5$\alpha$-pregnen-17$\alpha$-ol-2,20-dione derivatives, to the 6$\alpha$-methyl, and/or 16$\alpha$ or 16$\beta$-methyl derivatives thereof, as well as to the corresponding 11$\beta$-hydroxy or 11-keto and or 21-hydroxy derivatives thereof, and further, to the respective C–17 and or C–21-esters.

The novel compounds of the present invention are represented by the following formulae:

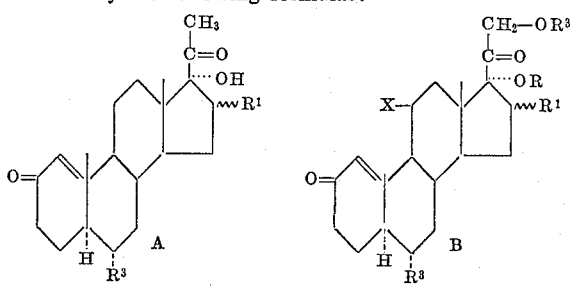

In the above formulae R and $R^2$, each, represents hydrogen or a hydrocarbon carboxylic acyl group of less than 12 carbon atoms; $R^1$ represents hydrogen, $\alpha$-methyl or $\beta$-methyl; $R^3$ represents hydrogen or methyl and X represents hydrogen, a keto-group or a $\beta$-hydroxyl group.

The acyl groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy, containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The compounds represented by Formula A are progestational compounds with oral activity, useful in the control of fertility and they also exhibit anti-estrogenic and anti-gonadotrophic activities. In addition they lower the blood and adrenal cholesterol levels.

The compounds represented by Formula B have anti-inflammatory properties and glycogen cumulative activities. In addition they reduce the thymus and are anti-estrogenic and anti-gonadotrophic hormones.

The novel compounds of this invention are prepared by the process exemplified by the following equation:

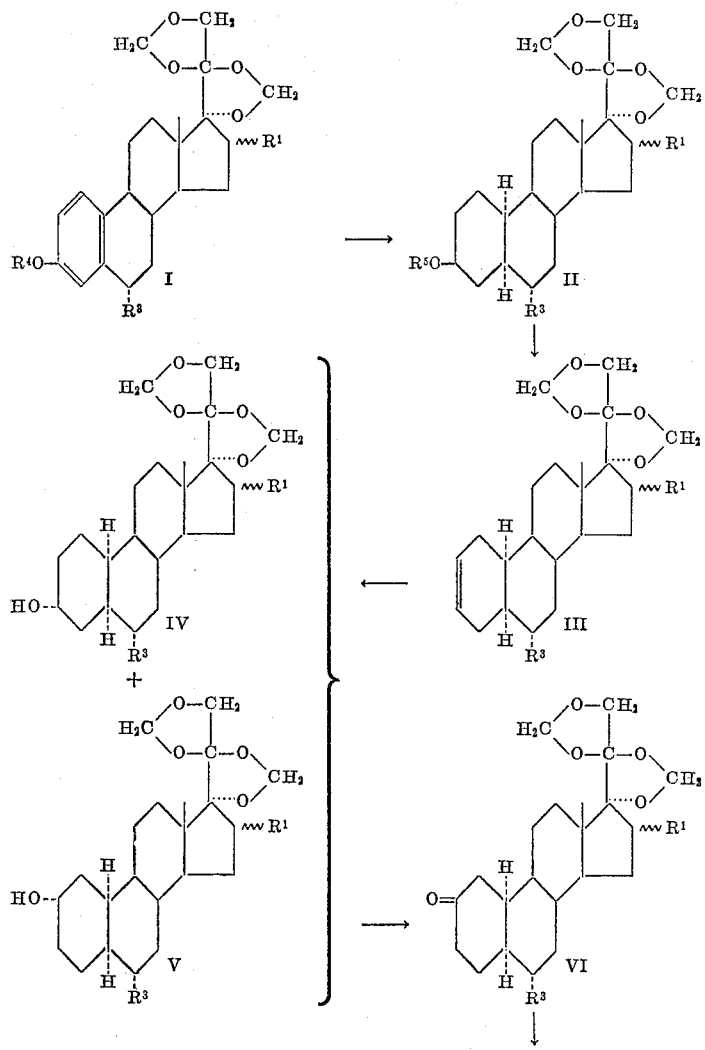

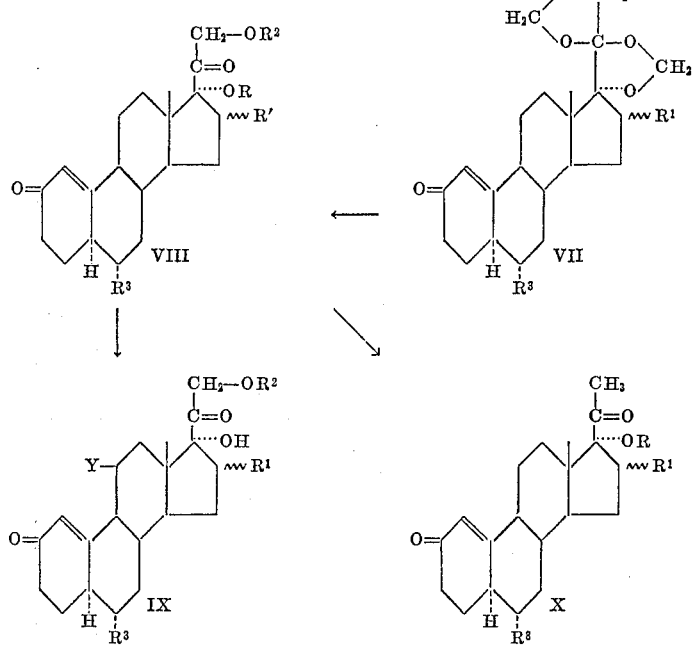

In the above formulae R, $R^1$, $R^2$, and $R^3$ have the same meaning as previously set forth; $R^4$ represents hydrogen, a lower alkyl radical of less than 8 carbon atoms or a hydrocarbon carboxylic acyl group of less than 12 carbon atoms; $R^5$ represents hydrogen or a lower alkyl radical of less than 8 carbon atoms and Y represents β-hydroxy or keto.

In carrying out the above outlined process, the starting compound (I) which is a 17,20;20,21-bismethylenedioxy-19-nor-$\Delta^{1,3,5(10)}$-pregnatrien - 3 - ol derivative, the corresponding lower alkyl-3-ether described in U.S. Patent No. 3,002,968 or the 3-acyl derivative thereof (prepared by conventional esterification of the respective 3-free hydroxyl compound, preferably by treatment with an anhydride derived from a hydrocarbon carboxylic acid of less than 12 carbon atoms and in the presence of p-toluenesulfonic acid) is hydrogenated in the presence of a catalyst, such as ruthenium dioxide preferably in an ethanolic suspension and under a pressure varying between 80 and 200 atmospheres, generally at a temperature which varies from ambient temperature to 150° C. to produce the 17,20;20,21-bismethylenedioxy - 19 - nor-5α,10α-pregnan-3β-ol or the corresponding 3-alkyl ether thereof (II). This 3β-hydroxy steroid compound upon reaction with acetic anhydride and boron trifluoride etherate in the presence of an alkali metal halide, such as lithium halide and at steam bath temperature, gives the corresponding 17,20;20,21-bismethylenedioxy - 19 - nor-5α,10α-$\Delta^2$-pregnene derivative (III). Treatment of this compound with diborane, dissolved in a suitable solvent such as tetrahydrofuran, followed by reaction of the organoboron steroid compound thus formed with hydrogen peroxide in the presence of an aqueous solution of sodium hydroxide and at a temperature of around 15–30° C., produces the 17,20;20,21-bismethylenedioxy-19-nor-5α,10α-pregnan-2α-ol (V) as well as the corresponding 17,20;20,21-bismethylenedioxy-19-nor-5α,10α-pregnan-3β-ol (IV) which may be easily separated by column chromatography or by fractional crystallization. Upon oxidation of the 17,20;20,21-bismethylenedioxy - 19 - nor-5α,10α-pregnan-2α-ol (V) by conventional methods, such as for example treatment with an 8 N solution of chromium trioxide in acetone-sulfuric acid solution (Jones reagent) and at a temperature preferably around 0–5° C., produces 17,20;20,21-bismethylenedioxy - 19 - nor-5α,10α-pregnan-2-one (VI). Upon introduction of a double bond into the latter compound, between C–1 and C–10 positions, preferably by reaction of the aforesaid saturated ketone (VI) with 1.1 molar equivalents of bromine in acetic acid and in the presence of hydrobromic acid and the subsequent dehydrohalogenation of the thus obtained 1-bromo-2-keto-steroid compound, principally by heating under reflux with calcium carbonate in a nitrogenated organic solvent, such as N-dimethylformamide, there is produced 17,20;20,21-bismethylenedioxy-19-nor-$\Delta^{1(10)}$-5α-pregnen-2-one (VII). The 17,20;20,21-bismethylenedioxy grouping of the latter compound is conventionally hydrolyzed with an acid such as formic acid to produce the corresponding 17α,21-dihydroxy-20-keto compounds (VIII; R and $R^2$=H). The conventional treatment of these steroid derivatives, preferably with an anhydride derived from a hydrocarbon carboxylic acid of less than 12 carbon atoms and in the presence of pyridine produces the respective C–21 acylates of 19-nor-$\Delta^{1(10)}$-5α-pregnene-17α,21-diol-2,20-dione (VIII; R=H; $R^2$=acyl). The conventional esterification of the free hydroxyl group at C–17α of the last mentioned compounds, with a hydrocarbon carboxylic anhydride of the type described above (which hydrocarbon chain may be equal or different to the one of the acyl radical previously attached to C–21) and in the presence of p-toluenesulfonic acid, produces the C–17, C–21-diacylates of 19-nor-$\Delta^{1(10)}$-5α-pregnene-17α,21-diol-2,20-dione (VIII; R and $R^2$=acyl).

The compounds derived from 21-monoacylate of 19-nor-$\Delta^{1(10)}$-5α-pregnene-17α,21 - diol - 2,20 - dione (VIII; R=H; $R^2$=acyl) upon incubation with adrenal glands in a suitable medium, for example an aqueous solution of alkali metal phosphate and chlorides and magnesium sulfate, mixed with an aqueous solution of fumaric acid and sodium hydroxide for a period of time of the order of 3 hours, approximately at a temperature of around 28–37° C. produced the corresponding 21-acylate of 19- nor - Δ$^{1(10)}$ - 5α - pregnene-11β,17α, 21-triol-2,20-dione (IX: R$^2$=acyl; Y=β-hydroxy) which upon subsequent oxidation, preferably with an 8 N solution of chromium trioxide in acetone-sulfuric acid solution (Jones reagent), produce the corresponding 19-nor-Δ$^{1(10)}$ - 5α - pregnene-17α,21 - diol - 2,11,20-trione 21-acylate derivatives (IX; R$^2$=acyl; Y=keto).

The elimination of the 21-hydroxy group of the 19-nor-Δ$^{1(10)}$-5α-pregnene-17α,21-diol-2,20-dione derivatives (VIII: R and R$^2$=H) is carried out by treatment with tosyl chloride in pyridine solution and subsequent detosylation of the formed 21-tosylate, as per heating under reflux with sodium iodide in acetic acid, to give the respective 19-nor-Δ$^{1(10)}$-5α-pregnen - 17α - ol-2,20 - dione (X; R=H). Conventional acylation of this compound with an acylating agent such as anhydride of a hydrocarbon carboxylic acid of the previously defined type and in the presence of p-toluenesulfonic acid produces the 17-acylates of the aforesaid compound (X; R=acyl).

The following specific examples serve to illustrate the present invention but are not intended to limit it:

PREPARATION 1

To a solution of 10 grams of 6α,16β-dimethyl-Δ$^{1,4}$-pregnadiene-17α,21-diol-3,20-dione in 400 cc. of chloroform, were added 80 cc. of a 37% aqueous solution of formaldehyde and 10 cc. of concentrated hydrochloric acid and the mixture was stirred during 48 hours at room temperature. The two layers were separated, the aqueous layer was washed with chloroform, and the organic solution combined and washed to neutral with water, dried over anhydrous sodium sulfate and evaporated to dryness. The residue was recrystallized from methanol ether thus producing 6α,16β-dimethyl - 17,20;20,21 - bismethylenedioxy-Δ$^{1,4}$-pregnadien-3-one.

A solution of 7 g. of 6α,16β-dimethyl-17,20;20,21-bis-methylenedioxy-Δ$^{1,4}$-pregnadien-3-one in 400 cc. of mineral oil was added dropwise, approximately 2 cc. per second, through a glass tube (32 x 3.0 cm.) filled with Pyrex glass helices and heated to 600° C. The resulting cloudy dark yellow solution was passed though a column containing 300 g. of ethyl acetate-washed alumina and the mineral oil was washed out with hexane. Elution with hexane-benzene and benzene gave the starting material, whereas further elution with benzene-ether and ether furnished semisolid fractions. These on crystallization from acetone-hexane, followed by recrystallization of the solid product from acetone, gave 6α,16β - dimethyl-17,20;20,21 - bismethylenedioxy-19-nor-Δ$^{1,3,5(10)}$-pregnatrien-3-ol.

To a solution of 5 g. of preceding compound in 100 cc. of anhydrous benzene were added 1 g. of p-toluenesulfonic acid and 15 cc. of acetic anhydride and the mixture was allowed to stand for 24 hours at room temperature, poured into ice water and the resulting mixture stirred to effect hydrolysis of the excess anhydride. The benzene layer was separated and washed with 10% sodium carbonate solution and water. Drying, evaporation and crystallization of the residue from ether-hexane produced the acetate of 6α,16β-dimethyl-17,20;20,21-bismethylenedioxy-19-nor-Δ$^{1,3,5(10)}$-pregnatrien-3-ol.

16β-methyl-Δ$^{1,4}$-pregnadiene-17α,21-diol - 3,20 - dione was treated following the same reaction sequence, thus producing consecutively 16β-methyl-17,20;20,21-bismethylenedioxy-Δ$^{1,4}$-pregnadien-3-one, 16β-methyl-17,20;20,21-bismethylenedioxy-19-nor-Δ$^{1,3,5(10)}$-pregnatrien-3 - ol and finally the corresponding acetate thereof.

PREPARATION 2

The starting compounds listed under I were treated following the same esterification procedure as described in Preparation 1, except that acetic anhydride was substituted by propionic anhydride, to give the respective esters listed under II:

| Starting Compounds I | Esters II |
|---|---|
| 6α, 16β-dimethyl-17,20;20,21-bismethylenedioxy-19-nor-Δ$^{1,3,5(10)}$-pregnatrien-3-ol. | Propionate of 6α,16β-dimethyl-17,20;20,21-bismethylenedioxy-19-nor-Δ$^{1,3,5(10)}$-pregnatrien-3-ol. |
| 16β-methyl-17,20;20,21-bismethylenedioxy-19-nor-Δ$^{1,3,5(10)}$-pregnatrien-3-ol. | Propionate of 16β-methyl-17,20;20,21-bismethylenedioxy-19-nor-Δ$^{1,3,5(10)}$-pregnatrien-3-ol. |
| 17,20;20,21-bismethylenedioxy-19-nor-Δ$^{1,3,5(10)}$-pregnatrien-3-ol. | Propionate of 17,20;20,21-bismethylenedioxy-19-nor-Δ$^{1,3,5(10)}$-pregnatrien-3-ol. |

Example I

A solution of 50 g. of the 3-methyl ether of 6α,16α-dimethyl - 17,20;20,21 - bismethylenedioxy - 19 - nor-Δ$^{1,3,5(10)}$-pregnatrien-3-ol (U.S. Patent No. 3,002,968) in 700 cc. of ethanol was hydrogenated firstly in the presence of 1.2 grams of ruthenium dioxide catalyst (RuO$_2$) under a pressure of 1,600 p.s.i. and at room temperature; then the mixture was heated to 125° C. The hydrogenation was continued during 7 hours. The mixture was cooled, the catalyst filtered off and the filtrate evaporated to dryness. By chromatography of the residue through a neutral alumina column and recrystallization of the solid fractions eluted with benzene ether (60:40) there was obtained the 3-methyl ether of 6α,16α-dimethyl-17,20;20,21-bismethylenedioxy-19-nor-5α,10α-pregnan-3β - ol (Compound No. 1).

The starting compounds listed under I were treated by the same procedure to produce the corresponding products under II.

| I | Cpd. No. | II |
|---|---|---|
| 6α, 16β-dimethyl-17,20;20-21-bismethylenedioxy-19-nor-Δ$^{1,3,5(10)}$-pregnatrien-3-ol. | 2 | 6α, 16β-dimethyl-17,20;20-21-bismethylenedioxy-19-nor-5α,10α-pregnan-3β-ol. |
| 16β-methyl-17,20;20-21-bismethylenedioxy-19-nor-Δ$^{1,3,5(10)}$-pregnatrien-3-ol. | 3 | 16β-methyl-17,20;20,21-bismethylenedioxy-19-nor-5α,10α-pregnan-3β-ol. |
| acetate of 6α,16β-dimethyl-17,20;20,21-bismethylenedioxy-19-nor-Δ$^{1,3,5(10)}$-pregnatrien-3-ol. | 2 | 6α,16β-dimethyl-17,20;20-21-bismethylenedioxy-19-nor-5α,10α-pregnan-3β-ol. |
| acetate of 16β-methyl-17,20;20,21-bismethylenedioxy-19-nor-Δ$^{1,3,5(10)}$-pregnatrien-3-ol. | 3 | 16β-methyl-17,20;20,21-bismethylenedioxy-19-nor-5α,10α-pregnan-3β-ol. |
| propionate of 6α, 16β,dimethyl-17,20;20,21-bismethylenedioxy-19-nor-Δ$^{1,3,5(10)}$-pregnatrien-3β-ol. | 2 | 6α,16β-dimethyl-17,20;20,21-bismethylenedioxy-19-nor-5α,10α-pregnan-3β-ol. |
| propionate of 16β-methyl-17,20;20,21-bismethylenedioxy-19-nor-Δ$^{1,3,5(10)}$-pregnatrien-3-ol. | 3 | 16β-methyl-17,20;20,21-bismethylenedioxy-19-nor-5α,10α-pregnan-3β-ol. |
| propionate of 17,20;20,21-bismethylenedioxy-19 nor-Δ$^{1,3,5(10)}$-pregnatrien-3-ol. | 4 | 17,20;20,21-bismethylenedioxy-19-nor-5α,10α-pregnan-3β-ol. |
| 17,20;20,21-bismethylenedioxy-19-nor-Δ$^{1,3,5(10)}$-pregnatrien-3-ol. | 4 | 17,20;20,21-bismethylenedioxy-19-nor-5α,10α-pregnan-3β-ol. |
| 16α-methyl-17,20;20-21-bismethylenedioxy-91-nor-Δ$^{1,3,5(10)}$-pregnatrien-3-ol. | 5 | 16α-methyl-17,20;20,21-bismethylenedioxy-19-nor-5α,10α-pregnan-3β-ol. |
| 3-methyl ether of 16α-methyl 17,20;20,21-bismethylenedioxy-19-nor-Δ$^{1,3,5(10)}$-pregnatrien-3-ol. | 6 | 3-methyl ether of 16α,methyl-17,20;20,21-bismethylenedioxy-19-nor-5α,10α-pregnan-3β-ol. |
| 3-methyl ether of 17,20;20,21-bismethylenedioxy-19-nor-Δ$^{1,3,5(10)}$-pregnatrien-3-ol. | 7 | 3-methyl ether of 17,20;20,21-bismethylene-dioxy-19-nor-5α-10α-pregnan-3β-ol. |
| 3-methyl ether of 6α-methyl 17,20;20,21-bismethylenedioxy-19-nor-Δ$^{1,3,5(10)}$-pregnatrien-3-ol. | 8 | 3-methyl ether of 6α-methyl-17,20;20,21-bismethylenedioxy-19-nor-5α,10α-pregnan-3β-ol. |

Example II

A mixture of 10 g. of the 3-methyl ether of 6α,16α-dimethyl-17,20;20,21-bismethylenedioxy-19 - nor - 5α,10α-pregnan-3β-ol (Cpd. No. 1), 50 g. of anhydrous lithium bromide, 250 cc. of freshly distilled acetic anhydride and 6 cc. of boron trifluoride etherate, also freshly distilled, was heated in a steam bath for 2 hours. The mixture was poured into ice water and was stirred until the excess of anhydride was hydrolized, then extracted several times with ethyl acetate in portions of 500 cc. each. The combined organic extracts were washed with sodium bicarbonate solution and then with water until neutral. The organic solution was dried over sodium sulfate and evaporated to dryness, the product was crystallized from methanol to give 6α,16α-dimethyl-17,20;20,21-bismethylenedioxy-19-nor-5α,10α-Δ²-pregnene (Cpd. No. 9).

Following exactly the same technique, there were treated the compounds Nos. 2 to 8, inclusive, thus producing respectively:

Cpd. No.:
10. 6α,16β - dimethyl - 17,20;20,21 - bismethylenedioxy-19-nor-5α,10α-Δ²-pregnene.
11. 16β - methyl - 17,20;20,21 - bismethylenedioxy-19-nor-5α,10α-Δ²-pregnene.
12. 17,20;20,21 - bismethylenedioxy-19-nor-5α,10α-Δ²-pregnene.
13. 16α - methyl - 17,20;20,21 - bismethylenedioxy-19-nor-5α,10α-Δ²-pregnene.
13. 16α-methyl-17,20;20,21-bismethylenedioxy - 19-nor-5α,10α-Δ²-pregnene.
12. 17,20;20,21-bismethylenedioxy-19-nor - 5α,10α-Δ²-pregnene.
14. 6α - methyl - 17,20;20,21-bismethylenedioxy-19-nor-5α,10α-Δ²-pregnene.

*Example III*

A slow stream of diborane was passed through a solution of 10 g. of 6α,16α-dimethyl-17,20;20,21-bismethylenedioxy-19-nor-5α,10α-Δ²-pregnene (Cpd. No. 9) in 125 cc. of tetrahydrofuran for 1 hour. (After 20 minutes the solution became warm and then the temperature slowly subsided.) The excess of diborane was decomposed by careful addition of water. Then 1 lt. of water was added and the formed precipitate was filtered, washed and dried, thus giving 9.6 g. of the organoboron compound.

This material was dissolved in 200 cc. of tetrahydrofuran and treated with 9 g. of sodium hydroxide previously dissolved in 25 cc. of water, and 45 cc. of 35% hydrogen peroxide, stirring and keeping the temperature around 15° C. The mixture was stirred for 2 hours, after this time, the precipitated product was filtered, washed and dried. The total crude product was chromatographed on a 300 g. neutral alumina column; the eluates obtained with a mixture of benzene-hexane (80:20) produced 6α,16α-dimethyl-17,20;20,21-bismethylenedioxy - 19 - nor-5α,10α-pregnen-3α-ol (Cpd. No. 15) and from the fractions eluted with benzene-ether (80:20), there was obtained 6α,16α - dimethyl-17,20;20,21-bismethylenedioxy-19-nor-5α,10α-pregnan-2α-ol (Cpd. No. 16), the latter compound predominating in the isomers mixture.

The compounds Nos. 10, 11, 12, 13, and 14 were treated following the same procedure thus producing respectively:

Cpd. No.:
17. 6α,16β - dimethyl - 17,20;20,21 - bismethylenedioxy-19-nor-5α,10α-pregnan-3α-ol.
18. 16β-methyl-17,20;20,21-bismethylenedioxy - 19-nor-5α,10α-pregnan-3α-ol.
19. 17,20;20,21-bismethylenedioxy-19-nor - 5α,10α-pregnan-3α-ol.
20. 16α-methyl-17,20;20,21 - bismethylenedioxy - 19-nor-5α,10α-pregnan-3α-ol.
21. 6α - methyl - 17,20;20,21-bismethylenedioxy-19-nor-5α,10α-pregnan-3α-ol.

together with the corresponding 2α-hydroxy isomers:
22. 6a,16β - dimethyl - 17,20;20,21 - bismethylenedioxy - 19 - nor - 5α,10α-pregnan-2α-ol.
23. 16β - methyl - 17,20;20,21-bismethylenedioxy-19-nor-5α,10α-pregnan-2α-ol.
24. 17,20;20,21 - bismethylenedioxy - 19-nor-5α,10α-pregnan-2α-ol.

Cpd. No.:
25. 16α - methyl - 17,20;20,21 - bismethylenedioxy-19-nor-5α,10α-pregnan-2α-ol.
26. 6α - methyl - 17,20;20,21 - bismethylenedioxy-19-nor-5α,10α-pregnan-2α-ol.

*Example IV*

A solution of 1 g. of 6α,16α-dimethyl-17,20;20,21-bismethylenedioxy-19-nor-5α,10α-pregnen-2α-ol (Cpd. No. 16) in 10 cc. of acetone was cooled to 0° C, and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 6α,16α-dimethyl-17,20;20,21-bismethylenedioxy - 19 - nor-5α,10α-pregnan-2-one (Cpd. No. 27).

The 2α-hydroxy steroid compounds Nos. 22 to 26, inclusive, were treated according to the preceding example to give respectively:

Cpd. No.:
28. 6a,16β-dimethyl-17,20;20,21-bismethylenedioxy-19-nor-5α,10α-pregnan-2-one.
29. 16β - methyl-17,20;20,21-bismethylenedioxy-19-nor-5α,10α-pregnan-2-one.
30. 17,20;20,21 - bismethylenedioxy - 19 - nor-5α,-10α-pregnan-2-one.
31. 16α - methyl - 17,20;20,21 - bismethylenedioxy-19-nor-5α,10α-pregnan-2-one.
32. 6α - methyl - 17,20;20,21 - bismethylenedioxy-19-nor-5α,10α-pregnan-2-one.

*Example V*

A solution of 5 g. of compound No. 27 (prepared according to Example IV) in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the formed precipitate filtered, washed with water to neutral and dried under vacuum. Recrystallization from acetone-hexane yielded 1-bromo-6α,16α-dimethyl-19-nor-5α,10α-pregnan-2-one.

2 g. of the preceding 1-bromo-2-keto steroid compound in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 6α,16α-dimethyl-17,20;20,21 - bismethylenedioxy-19-nor-Δ$^{1(10)}$ - 5α - pregnen-2-one (Cpd. No. 33).

The compounds Nos. 28 to 32, inclusive were treated following the same procedure, thus producing respectively:

Cpd. No.:
34. 6α,16β - dimethyl-17,20;20,21 - bismethylenedioxy-19-nor-Δ$^{1(10)}$-5α-pregnen-2-one.
35. 16β - methyl - 17,20;20,21-bismethylenedioxy-19-nor-Δ$^{1(10)}$-5α-pregnen-2-one.
36. 17,20;20,21-bismethylenedioxy - 19 - nor-Δ$^{1(10)}$-5α-pregnen-2-one.
37. 16α - methyl-17,20;20,21-bismethylenedioxy-19-nor-Δ$^{1(10)}$-5α-pregnen-2-one.
38. 6α - methyl - 17,20;20,21-bismethylenedioxy-19-nor-Δ$^{1(10)}$-5α-pregnen-2-one.

Example VI 1 g. of 6α,16α-dimethyl-17,20;20,21-bismethylenedioxy-19-nor-$\Delta^{1(10)}$-5α-pregnen-2-one (Cpd. No. 33) was heated on the steam bath with 20 cc. of 60% formic acid for 1 hour, cooled, diluted with water and the precipitate was collected, washed with water, dried and recrystallized from acetone-hexane, thus affording 6α,16α-dimethyl-19-nor-$\Delta^{1(10)}$-5α-pregnene-17α,21-diol-2,20-dione (Cpd. No. 39).

The compounds Nos. 34 to 38, inclusive, were reacted in the same manner to give respectively:

Cpd. No.:
40. 6α,16β - dimethyl - 19 - nor-$\Delta^{1(10)}$-5α-pregnene-17α,21-diol-2,20-dione.
41. 16β-methyl-19-nor-$\Delta^{1(10)}$-5α-pregnene-17α,-17α,-21-diol-2,20-dione.
42. 19-nor-$\Delta^{1(10)}$-5α-pregnene-17α,21-diol-2,20-dione.
43. 16α - methyl-19-nor-$\Delta^{1(10)}$-5α-pregnene - 17α,21-diol-2,20-dione.
44. 6α - methyl - 19 - nor-$\Delta^{1(10)}$-5α-pregnene-17α,-21-diol-2,20-dione.

Example VII

A mixture of 1 g. of 6α,16α-dimethyl-19-nor-$\Delta^{1(10)}$-5α-pregnene-17α,21-diol-2,20-dione (Cpd. No. 39), 8 cc. of pyridine and 4 cc. of acetic anhydride was kept at room temperature overnight, poured into iced water, the formed precipitate filtered, washed with water and dried. Crystallization from acetone-hexane produced the 21-acetate of 6α,16α - dimethyl - 19 - nor - $\Delta^{1(10)}$ - 5α-pregnene-17α,21-diol-2,20-dione (Cpd. No. 45).

The compounds Nos. 40 to 44, inclusive, were treated following the same procedure, to give respectively:

Cpd. No.:
46. 21 - acetate of 6α,16β-dimethyl-19-nor-$\Delta^{1(10)}$-5α-pregnene-17α,21-diol-3,20-dione.
47. 21-acetate of 16β-methyl-19-nor-$\Delta^{1(10)}$-5α-pregnene-17α,21-diol-2,20-dione.
48. 21-acetate of 19-nor-$\Delta^{1(10)}$-5α-pregnene-17α,21-diol-2,20-dione.
49. 21-acetate of 16α-methyl-19-nor-$\Delta^{1(10)}$-5α-pregnene-17α,21-diol-2,20-dione.
50. 21-acetate of 6α-methyl-19-nor-$\Delta^{1(10)}$-5α-pregnene-17α,21-diol-2,20-dione.

Example VIII

The compounds Nos. 39 to 44, inclusive, were treated according to Example VII, except that acetic anhydride was substituted by propionic anhydride, caproic anhydride and cyclopentylpropionic anhydride, to obtain the corresponding C-21-propionates, C-21-caproates and C-21-cyclopentylpropionates of the aforesaid compounds.

Example IX

To a solution of 5 g. of the 21-acetate of 6α,16α-dimethyl - 19-nor-$\Delta^{1(10)}$-5α-pregnene-17α,21-diol-2,20-dione (Cpd. No. 45) in 100 cc. of anhydrous benzene, there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the diacetate of 6α,-16α - dimethyl-19-nor-$\Delta^{1(10)}$-5α-pregnene-17α,21-diol-3,20-dione (Cpd. No. 51).

Upon applying the same technique to the compounds Nos. 46 to 50, inclusive, there were obtained the corresponding diesters which are set forth below:

Cpd. No.:
52. Diacetate of 6α,16β-dimethyl-19-nor-$\Delta^{1(10)}$-5α-pregnene-17α,21-diol-3,20-dione.
53. Diacetate of 16β-methyl-19-nor-$\Delta^{1(10)}$-5α-pregnene-17α,21-diol-3,20-dione.
54. Diacetate of 19-nor-$\Delta^{1(10)}$-5α-pregnene-17α,21-diol-3,20-dione.
55. Diacetate of 16α-methyl-19-nor-$\Delta^{1(10)}$-5α-pregnene-17α,21-diol-3,20-dione.
56. Diacetate of 6α - methyl-19-nor-$\Delta^{1(10)}$-5α-pregnene-17α,21-diol-3,20-dione.

Example X

The compounds Nos. 45 to 50, inclusive, were treated following the procedure of Example IX, except that acetic anhydride was substituted by propionic anhydride, caproic anhydride, and cyclopentylpropionic anhydride, to give the corresponding 21-acetate-17-propionates, 21-acetate-17-caproates and 21-acetate-17-cyclopentylpropionates of the aforementioned compounds.

The C-21 esters obtained in Example VIII were treated in the same manner, to obtain the respective C-17, C-21 steroid diesters.

Example XI

The following solutions "A," "B" and "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixture of A, B, and C solutions with vigorous stirring. To the mixture there was then added 1 g. of the 21-acetate of 6α,16α-dimethyl-19-nor-$\Delta^{1(10)}$-5α-pregnen-17α,21-diol-2,20-dione (Cpd. No. 45) dissolved in 5.35 parts of propyleneglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions eluted with benzene-ether (70:30) afforded the 21-acetate of 6α,16α-dimethyl - 19 - nor - $\Delta^{1(10)}$-5α-pregnene-11β,17α,21-triol-2,20-dione (Cpd. No. 57).

The compounds Nos. 46 to 50, inclusive, were treated following the same procedure, thus producing respectively:

Cpd. No:
58. 21-acetate of 6α,16β-dimethyl-19-nor-$\Delta^{1(10)}$-5α-pregnene-11β,17α,21-triol-2,20-dione.
59. 21-acetate of 16β-methyl-19-nor-$\Delta^{1(10)}$-5α-pregnene-11β,17α,21-triol-3,20-dione.
60. 21-acetate of 19-nor-$\Delta^{1(10)}$-5α-pregnene-11β,17α,21-triol-3,20-dione.
61. 21-acetate of 16α-methyl-19-nor-$\Delta^{1(10)}$-5α-pregnene-11β,17α,21-triol-3,20-dione.
62. 21-acetate of 6α-methyl-19-nor-$\Delta^{1(10)}$-5α-pregnene-11β,17α,21-triol-3,20-dione.

Example XII

The steroidal C-21-propionates, C-21-caproates and C-21-cyclopentylpropionates obtained in Example VIII were treated following the hydroxylation procedure of Example XI, to give the corresponding C-11 hydroxy steroid derivatives.

Example XIII

The compounds Nos. 57 to 62, inclusive, were reacted in a manner according to Example IV, thus giving respectively:

Cpd. No.:
63. 21-acetate of 6α,16α-dimethyl-19-nor-Δ$^{1(10)}$-5α-pregnene-17α,21-diol-2,11,20-trione.
64. 21 - acetate of 6α,16β-dimethyl-19-nor-Δ$^{1(10)}$-5α-pregnene-17α,21-diol-2,11,20-trione.
65. 21 - acetate of 16β-methyl-19-nor-Δ$^{1(10)}$-5α-pregnene-17α,21-diol-2,11,20-trione.
66. 21-acetate of 19-nor-Δ$^{1(10)}$-5α-pregnene-17α,21-diol-2,11,20-trione.
67. 21-acetate of 16α-methyl-19-nor-Δ$^{1(10)}$-5α-pregnene-17α,21-diol-2,11,20-trione.
68. 21-acetate of 6α-methyl-19-nor-Δ$^{1(10)}$-5α-pregnene-17α,21-diol-2,11,20-trione.

Example XIV

The C–11 hydroxy steroid C–21-propionates, C–21-caproates and C–21-cyclopentylpropionates (obtained according to Example XII) were oxidized in an identical manner, by following the technique of Example IV, to obtain the corresponding C–21-acyloxy-17-keto steroid derivatives.

Example XV

A solution of 5 g. of 6α,16α-dimethyl-19-nor-Δ$^{1(10)}$-5α-pregnene-17α,21-diol-2,20-dione (Cpd. No. 39) in 25 cc. of pyridine was cooled to 0° C. Under stirring, there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus, there was obtained the crude 21-tosylate of 6α,16α-dimethyl-19-nor-Δ$^{1(10)}$-5α-pregnene-17α,21-diol-2,20-dione.

A solution of 2.5 g. of the above crude compound in 100 cc. of glacial acetic acid was treated with 7 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane, there was obtained 6α,16α-dimethyl-19-nor-Δ$^{1(10)}$-5α-pregnen-17α-ol-2,20-dione (Cpd. No. 69).

The compounds Nos. 40 to 44, inclusive, were treated following the two preceding procedures to produce the respective final compounds which are enumerated below:

Cpd. No.:
70. 6α,16β-dimethyl-19-nor-Δ$^{1(10)}$-5α-pregnen-17α-ol-2,20-dione.
71. 16β-methyl-19-nor-Δ$^{1(10)}$-5α-pregnen-17α-ol-2,20-dione.
72. 19-nor-Δ$^{1(10)}$-5α-pregnen-17α-ol-2,20-dione.
73. 16α-methyl-19-nor-Δ$^{1(10)}$-5α-pregnen-17α-ol-2,20-dione.
74. 6α-methyl-19-nor-Δ$^{1(10)}$-5α-pregnen-17α-ol-2,20-dione.

Example XVI

The compounds Nos. 69 to 74, inclusive, were treated following the same technique as in Example IX, to give respectively:

Cpd. No.:
75. Acetate of 6α,16α-dimethyl-19-nor-Δ$^{1(10)}$-5α-pregnen-17α-ol-2,20-dione.
76. Acetate of 6α,16β-dimethyl-19-nor-Δ$^{1(10)}$-5α-pregnen-17α-ol-2,20-dione.
77. Acetate of 16β-methyl-19-nor-Δ$^{1(10)}$-5α-pregnen-17α-ol-2,20-dione.
78. Acetate of 19-nor-Δ$^{1(10)}$-5α-pregnen-17α-ol-2,20-dione.
79. Acetate of 16α-methyl-19-nor-Δ$^{1(10)}$-5α-pregnen-17α-ol-2,20-dione.
80. Acetate of 6α-methyl-19-nor-Δ$^{1(10)}$-5α-pregnen-17α-ol-2,20-dione.

Example XVII

The starting compounds of the preceding example were treated by the procedure described in the same example, except that acetic anhydride was substituted by propionic anhydride, caproic anhydride and cyclopentylpropionic anhydride, to give the corresponding steroidal C–17-propionates, C–17-caproates and C–17-cyclopentylpropionates of the aforesaid compounds.

Example XVIII 2 g. of compound No. 57 were dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 6α,16α-dimethyl-19-nor-Δ$^{1(10)}$-5α-pregnene-11β,17α,21-triol-2,20-dione (Cpd. No. 81).

The compounds Nos. 58 to 68, inclusive, were treated by the same procedure to produce the corresponding 21-free alcohols.

I claim:
1. A compound of the following formula:

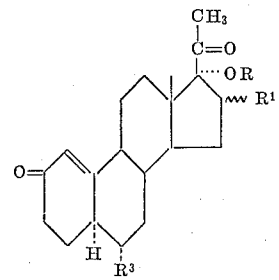

wherein R is selected from the group consisting of hydrogen and a hydrocarbon carboxylic acyl group of less than 12 carbon atoms; $R^1$ is a member of the group consisting of hydrogen, α-methyl and β-methyl; and $R^3$ is selected from the group consisting of hydrogen and methyl.

2. 6α,16α - dimethyl - 19 - nor - Δ$^{1(10)}$ - 5α - pregnen-17α-ol-2,20-dione.
3. 6α,16β - dimethyl - 19 - nor - Δ$^{1(10)}$ - 5α - pregnen-17α-ol-2,20-dione.
4. 16β - methyl - 19 - nor - Δ$^{1(10)}$ - 5α - pregnen - 17α-ol-2,20-dione.
5. 16α - methyl - 19 - nor - Δ$^{1(10)}$ - 5α - pregnen - 17α-ol-2,20-dione.
6. 6α - methyl - 19 - nor - Δ$^{1(10)}$ - 5α - pregnen - 17α-ol-2,20-dione.
7. A compound of the following formula:

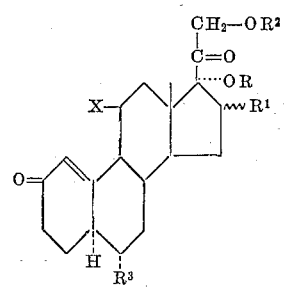

wherein R and R² are selected from the group consisting of hydrogen and a hydrocarbon carboxylic acyl group of less than 12 carbon atoms; R¹ is a member of the group consisting of hydrogen, α-methyl and β-methyl, R³ is selected from the group consisting of hydrogen and methyl; and X is selected from the group consisting of hydrogen, a keto group and a β-hydroxyl group.

8. 21-acetate of 6α,16β-dimethyl-19-nor-$\Delta^{1(10)}$-5α-pregnene-11β,17α,21-triol-2,20-dione.

9. 21-acetate of 16β-methyl-19-nor-$\Delta^{1(10)}$-5α-pregnene-11β,17α,21-triol-2,20-dione.

10. 21-acetate of 19-nor-$\Delta^{1(10)}$-5α-pregnene-11β,17α,21-triol-2,20-dione.

11. 21 - acetate of 16α - methyl - 19 - nor - $\Delta^{1(10)}$-5α-pregnene-11β,17α,21-triol-2,20-dione.

12. 21 - acetate of 6α - methyl - 19 - nor - $\Delta^{1(10)}$ - 5α-pregnene-11β,17α,21-triol-2,20-dione.

13. 21 - acetate of 6α,16α - dimethyl - 19 - nor - $\Delta^{1(10)}$-5α-pregnene-11β,17α,21-triol-2,20-dione.

14. 6α,16α - dimethyl - 19 - nor - $\Delta^{1(10)}$ - 5α - pregnene-11β,17α,21-triol-2,20-dione.

15. 21 - acetate of 6α,16α - dimethyl - 19 - nor - $\Delta^{1(10)}$-5α-pregnene-17α,21-diol-2,11,20-trione.

16. 21 - acetate of 6α,16β - dimethyl - 19 - nor - $\Delta^{1(10)}$-5α-pregnene-17α,21-diol-2,11,20-trione.

17. 21 - acetate of 16β - methyl - 19 - nor - $\Delta^{1(10)}$-5α-pregnene-17α,21-diol-2,11,20-trione.

18. 21 - acetate of 19 - nor - $\Delta^{1(10)}$ - 5α - pregnene-17α,21-diol-2,11,20-trione.

19. 21 - acetate of 16α - methyl - 19 - nor - $\Delta^{1(10)}$ - 5α-pregnene-17α,21-diol-2,11,20-trione.

20. 21 - acetate of 6α - methyl - 19 - nor - $\Delta^{1(10)}$ - 5α-pregnene-17α,21-diol-2,11,20-trione.

No references cited.